United States Patent Office 3,008,050
Patented Nov. 7, 1961

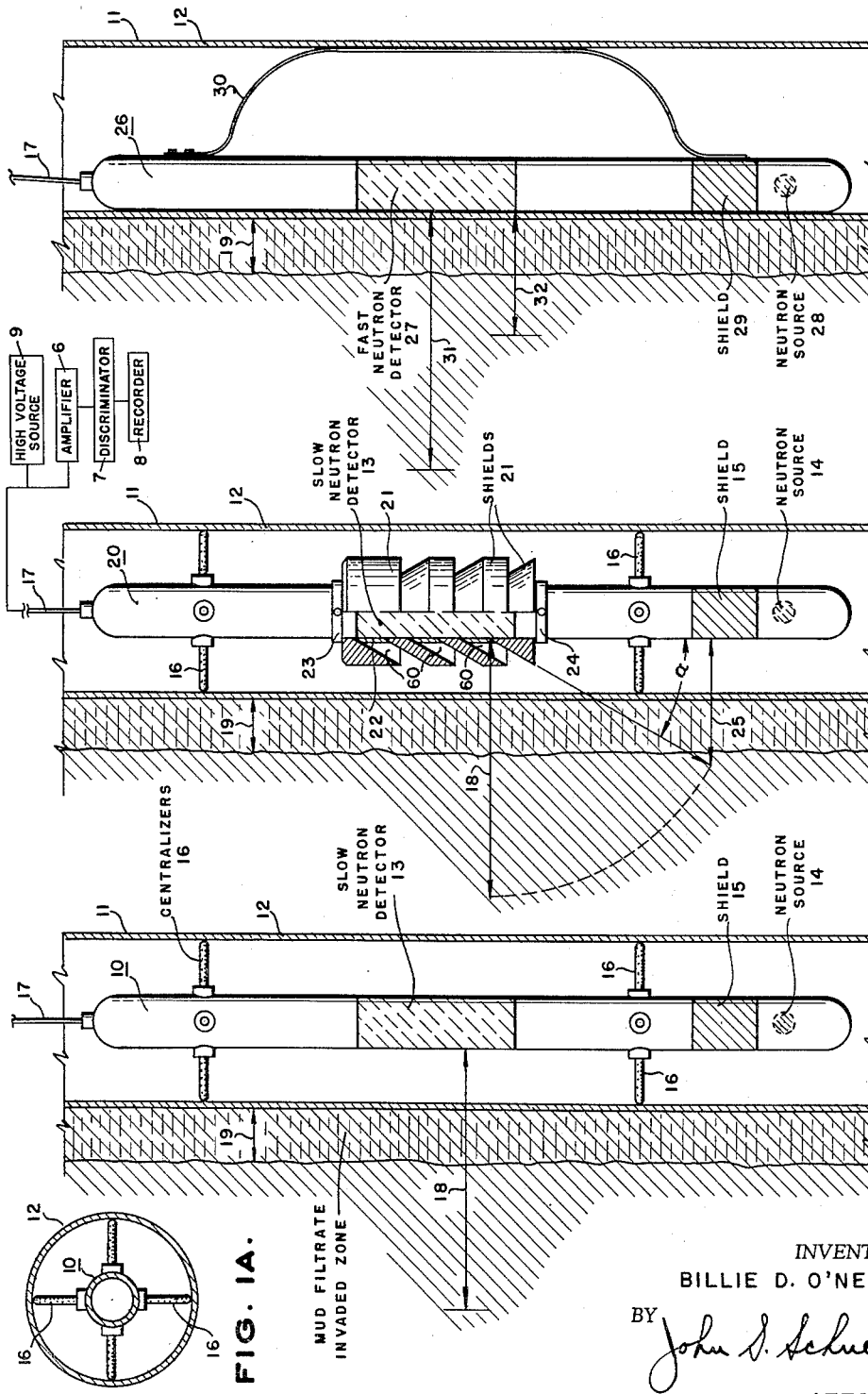

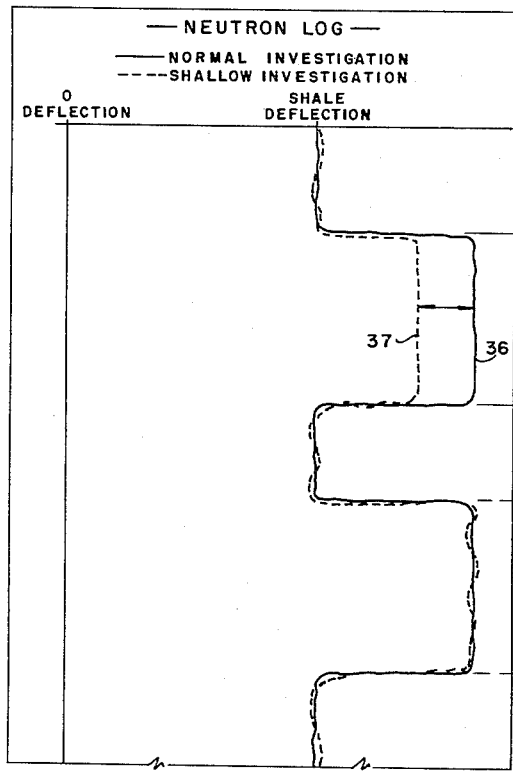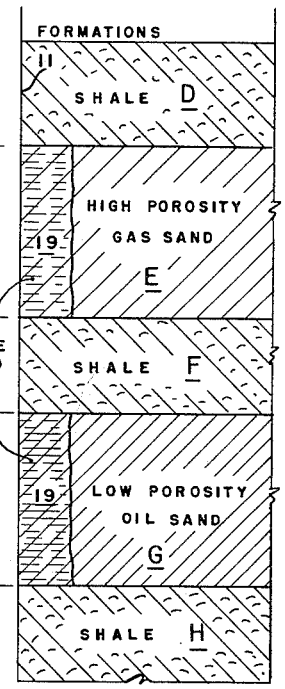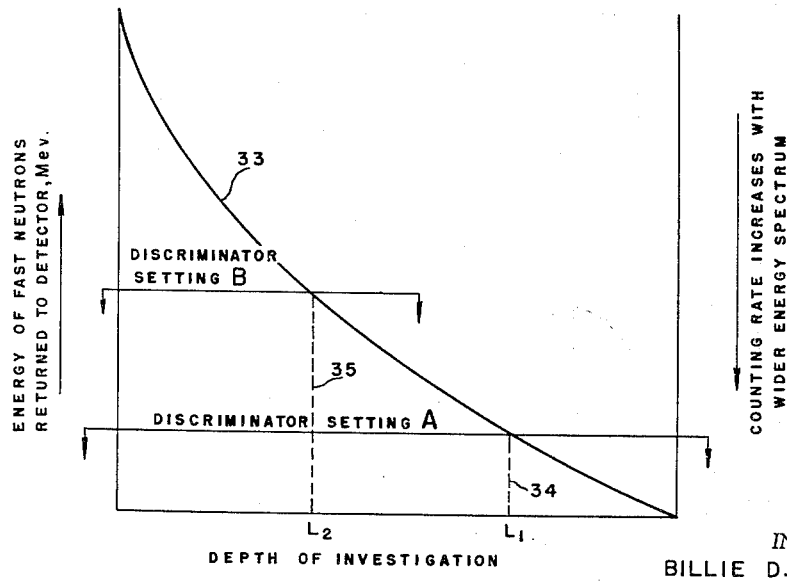
FIG. 5.
FIG. 4.
INVENTOR.
BILLIE D. O'NEAL,
BY John S. Schneider
ATTORNEY.

3,008,050
APPARATUS FOR LOGGING WELL BORES
Billie D. O'Neal, Bellaire, Tex., assignor, by mesne assignments, to Jersey Production Research Company, Tulsa, Okla., a corporation of Delaware
Filed Aug. 1, 1957, Ser. No. 675,684
8 Claims. (Cl. 250—83.3)

This invention relates generally to method and apparatus for distinguishing subsurface formations by means of radioactivity measurements. This invention is especially concerned with neutron logging methods and neutron logging tools utilized for distinguishing a gas sand in a well having a zone existing around the well bore that has been flushed or invaded by mud filtrate and where the hydrogen concentration in the uninvaded gas sand is much less than the hydrogen concentration in adjacent water or oil formations.

In the drilling of wells during drilling operations, drilling fluid or mud is circulated down the drill string and up the annulus between the drill string and the wall of the well bore. The liquid base of the mud penetrates to a greater or lesser extent the various formations traversed by the borehole drilled. This penetration is referred to herein as the mud-filtrate-flushed zone existing around the well bore.

To obtain the neutron log of a desired formation, the formation of interest is bombarded with a source of neutrons, which neutrons react in the formations. The induced gamma radiation resulting from the neutron reactions in the formation may be detected or the neutrons returning from the formation may be detected. Three general types of neutron logs which may be utilized are:

(1) Fast neutron bombardment-gamma detection;
(2) Fast neutron bombardment-slow neutron detection; and
(3) Fast neutron bombardment-fast neutron detection.

Thermal neutrons, also referred to herein as slow neutrons, have energies from the lowest possible to as much as 1,000 e.v. (electron volts). Fast neutrons are those having energies from 5 to 50 m.e.v. (million electron volts). Down-the-hole instrumentation for running logs of this type is well known in the art; consequently, a detailed discussion of such equipment herein is not considered necessary. For a discussion of suitable radiation logging tools, see:

Faul, H., and Tittle, C. W., "Logging of Drill Holes by the Neutron, Gamma Method and Gamma Ray Scattering," Geophysics (April 1951), 16, No. 2; and Tittle, C. W., Faul, H., and Goodman, C. "Neutron Logging of Drill Holes: The Neutron-Neutron Method," Geophysics (October 1951), 16, No. 4.

The neutron log obtained upon travers of a borehole is a function of the hydrogen concentration per unit volume in the cylindrical volume of formation investigated. The neutron log deflection increases with a decrease in hydrogen per unit volume of rock investigated. In sandstone reservoirs, the radial thickness of the cylinder investigated by conventional radiation logging tools is approximately 6 inches. In a water or oil sand formation, the hydrogen concentration per unit volume of a cylinder with a wall thickness equal to or less than the depth of flushing, which is 2 to 3 inches normally, is the same as the hydrogen concentration per unit volume of the larger cylinder investigated by conventional radiation logging tools. By conventional radiation logging tools is meant the commercial available tools such as those that utilize either an ionization chamber or a Geiger counter to detect induced gamma radiation or a proportional counter which detects thermal neutrons returned from the formation or a scintillation counter that detects fast neutrons returned from the formation.

This invention provides apparatus that permits a shallow depth of investigation. Conventional tools may be used to obtain a greater depth of investigation. The results of the small and large depths or cylinders of investigation obtained by these tools are then resolved to a common denominator and recorded on the same log. When an oil or water formation is logged, the deflections will be the same and there will be no departure between the two curves because the hydrogen concentration in each of the cylinders investigated will be the same; however, when a gas zone is traversed, the log for the shallow depth of investigation will indicate a greater hydrogen concentration per unit volume of sand investigated than the log for the deeper investigating conventional neutron logging instrument. Thus, when these two curves are recorded on the same log after being resolved to a common denominator, a definite departure between the two curves will exist.

In brief, this invention provides a method and apparatus for logging boreholes to distinguish subsurface formations of different hydrogen concentration.

The method comprises the subsurface formation with a source of primary radiation, detecting radiation resulting from said bombardment returned from a first selected zone surrounding the borehole, detecting radiation resulting from said bombardment returned from a second selected zone surrounding the borehole, said second zone including the first zone but extending a greater radial distance from the borehole than said first selected zone, separately translating the intensities of said radiation into electrical pulses and then either separately or simultaneously recording said electrical pulses vs. the depth of the borehole traversed.

One type of apparatus for detecting gas sands as disclosed herein utilizes a fast neutron detector which in one instance is adapted to detect a narrow spectrum of only the very highest energy level neutrons returned to the detector and secondly is adapted to detect a much wider spectrum of high energy level neutrons; that is, the detector in the first instance is adapted to detect neutrons of higher energy than in the second instance. Attendant to such apparatus will be a neutron source and a suitable electronic circuit for transmitting and recording the electrical pulses produced in the detector proportional to the energy of the detected neutrons. Discriminators may be employed to pass only electrical pulses above selected energy levels of the detected neutrons. Since such electronic apparatus and circuits are well known in the art details thereof will not be discussed herein.

Another type of detecting apparatus utilizes a neutron shield for use with a thermal neutron detector, the shield being designed so that the returning thermal neutrons are selectively detected in a specified direction thereby detecting neutrons only within a selected area surrounding the borehole. The thermal neutron logging device is also provided with a neutron source and a suitable electronic circuit for measuring and recording the electrical pulses produced, the number of pulses being indicative of the radiation intensity in the vicinity of the detector.

Thus, a primary object of this invention is to provide a method and apparatus for distinguishing between formations having different hydrogen concentrations.

Additional objects of this invention will be apparent from the description of the invention taken in conjunction with the drawing wherein:

FIG. 1 illustrates a slow neutron logging device positioned in a borehole;

FIG. 1A is a sectional view of the device of FIG. 1;

FIG. 2 illustrates a modified form of the slow neutron detector as shown in FIG. 1 for measuring the shallow zone of investigation;

FIG. 3 illustrates a fast neutron logging device arranged in a borehole.

FIG. 4 graphically illustrates the energy of fast neutrons returned to the detector shown in FIG. 3 vs. the depth of investigation.

FIG. 5 shows a comparison between a neutron logging curve as acquired wtih a conventional logging tool having a normal depth of investigation and one as acquired with a tool having a shallow depth of investigation.

Referring to the drawings in greater detail:

FIGS. 1 and 1A show a slow neutron logging device 10 arranged in a borehole 11 provided with a casing 12. The slow neutron logging device comprises essentially a slow neutron detector 13, a neutron source 14, a shield 15 positioned adjacent source 14, and spaced apart centralizers 16, all suspended on an electrically conductive cable 17. The shield 15 is provided to insure that the neutrons emitted by source 14 penetrate the formations surrounding the borehole prior to detection by the detector 13. The electrically conductive cable 17 is utilized to raise and lower the logging device 10 in the borehole 11 and to transmit electrical pulses to the earth's surface which pulses are produced in the detector in response to detected slow neutrons. The surface electronic equipment is well known, as noted supra, and may comprise a high voltage source 9, suitable amplifiers 6, discriminators 7 for selectively passing energy spectrums of a desired nature, and suitable recorders 8.

The arrowed line 18, in FIG. 1, designates the normal depth of investigation of slow neutron logging device 10. The arrowed line 19, in FIG. 1, designates the mud filtrate invaded zone.

FIG. 2 illustrates a shielded slow neutron counter that is used to obtain a shallow investigation. Thus, a shielded conventional slow neutron logging device, designated 20, is suspended by an electrically conductive cable 17 similarly to the embodiment of FIG. 1. The device 20 comprises a neutron source 14 adjacent to which is provided a shield 15 which functions to insure that the neutrons emitted by the source 14 penetrate the formation prior to detection. Spaced apart centralizers 16 are arranged on the logging device 20 to centralize the tool in borehole 11, which borehole is provided with a casing 12. A slow neutron detector 13 similar to or the same as the detector of FIG. 1 has arranged thereon a plurality of cadmium shields 21. These shields are conically configured and are maintained spaced apart by means of stainless steel spacers 22 and thereby form slots or openings 60; upper and lower stop rings 23 and 24, respectively, are provided to maintain the shields in position. The mud filtrate invaded zone is indicated as at 19 and the normal depth of investigation of the slow neutron detector 13 is indicated by arrowed line 18. As indicated by the arrowed line 25, a reduced effective depth of investigation is obtained by means of the cadmium shields 21. The total depth of investigation is approximately the same as for the slow neutron logging device of FIG. 1. However, because of the neutron absorption properties of cadmium, the cadmium shields permit only those neutrons to reach the detector which approach the detector opposite slots 60 at an angle alpha ($\alpha$) as shown. Accordingly, the effective depth of investigation with the shielded device attached is dependent on the solid angle subtended between the conical surface of the cadmium shield and the longitudinal axis of the logging device. The more acute angle $\alpha$ is made, the greater the reduction of the effective depth of investigation. The size of angle $\alpha$ is dependent upon such things as hole size, casing size, the type of formations traversed, and the depth of investigation desired. As in the previous embodiment, the electrically conductive cable 17 connects to suitable electronic apparatus whereby the pulses produced in the detector are recorded or logged.

FIG. 3 illustrates a fast neutron logging device 26 arranged in a borehole 11 having a casing 12 arranged therein. The fast neutron logging device 26 comprises a fast neutron detector 27, a source of neutrons 28, and a shield 29; a bow spring 30 is utilized to keep the logging device positioned against casing 12. The logging device 26 is suspended on an electrically conductive cable 17 similarly to the slow neutron detector arrangement of FIG. 1 and the cable connects to a suitable electronic circuit, such as that shown in FIG. 2 for measuring and recording neutron energies detected. Again the mud filtrate invaded zone is designated by arrowed line 19. The normal depth of investigation of the fast neutron detector is designated by arrowed line 31. The shallow depth of investigation to be achieved by discrimination is indicated by arrowed line 32.

FIG. 4 graphically illustrates a plot of energy of fast neutrons returned to the detector in m.e.v. versus the depth of investigation. The curve 33 of FIG. 4 is in reality a representation of the average energy of the neutrons returning from a given depth. Actually all neutrons that penetrate to a given depth and subsequently return to the detector will not have the same energy but will have a spread of energies. However, the average energies of neutrons returned from given distances in the formation will diminish with an increase in the distance they have traveled into the formation. Hence, curve 33 illustrates that a wider spectrum of fast neutron detection results in a greater depth of investigation. The neutron energy spectrum detected may be selectively enlarged or diminished by means of the discriminator setting wherein the electrical signal pulse heights which are proportional to the detected neutron energy are screened; that is, the discriminator may be set to pass pulses of a selected height. Therefore, as seen in FIG. 4, for a selected discriminator setting A, the depth of investigation would be some value $L_1$ indicated by dotted line 34. As noted, for a particular discriminator setting only those neutrons above a certain energy level will be detected. By changing the discriminator setting from A to a selected discriminator setting B, only neutrons of a much higher energy level are detected; therefore, the depth of investigation is much less and as illustrated by dotted line 35 is reduced to $L_2$ which is some fraction of $L_1$. The counting rate increases with depth of investigation. Therefore, to reduce the depth of investigation considerably, the discriminator setting has to be such that the counting rate is reduced considerably. The energy of a neutron returning to the detector is a function of the number of collisions it has experienced in traveling from the source through the reservoir rock and back to the detector. Hence, for a given condition the energy of a returning neutron is a function of its depth of investigation or the distance it has traveled into the formation.

FIG. 5 illustrates the logging records obtained by use of the slow neutron detector of FIG. 1 to give a normal depth of investigation and the shielded slow neutron detector as shown in FIG. 2 to give a shallow depth of investigation. The normal depth of investigation also may be obtained utilizing any conventional radiation logging tool instead of the slow neutron detector of FIG. 1. The normal depth curve is labeled 36, and the shallow depth curve is labeled 37. Similar curves may be obtained using the fast neutron logging device, shown in FIG. 3. The normal depth of investigation curve 36 may be obtained by traversing the formations with a discriminator setting A, as shown in FIG. 4, and the shallow depth of investigation curve 37 may be obtained by traversing the formation with a discriminator setting B. In this instance also the normal depth of investigation may be obtained utilizing any conventional radiation logging tool instead of using the fast neutron logging device of FIG. 3 with a discriminator setting A.

As further illustrated in FIG. 5, the borehole 11 traverses a plurality of subsurface formations D, E, F, G, and H which, as noted, comprise shale, high porosity gas sand, shale, low porosity oil sand, and shale, respectively. Mud filtrate invaded zones 19 are shown to exist in the high porosity gas sand E and the low porosity oil sand G.

The two curves are coincident for the shale formation D; however, for the high porosity gas sand the normal depth of investigation neutron log deflects more than the shallow depth of investigation neutron log. This difference in deflection is caused by there being a greater hydrogen concentration in the smaller zone of investigation than in the larger zone. For the shale formation F and the low porosity oil sand G, both the shallow depth and normal depth curves show the same deflection. This is caused by the deep and shallow zones having the same hydrogen concentration. The shale formation H is, again, of the same deflection as the shale formations D and F.

Although the explanation of the operation of the invention has been made only with relation to the detection of neutrons, the scope of the invention is not to be considered limited thereto. For example, gamma ray detection may be substituted for neutron detection when measuring the normal depth of investigation.

Having fully described the method, operation, elements and objects of my invention, I claim:

1. In apparatus for logging a borehole by detecting induced radiation produced from a selected zone surrounding the borehole and resulting from bombardment by primary radiation, said apparatus being provided with electrical means including a pulse recorder adapted to record electrical signals generated in response to the detected radiation; a radiation detector element sensitive to radiation returned from a selected zone surrounding the borehole, said detector element being provided with a plurality of spaced apart, concentric, overlapping, conically configured radiation shields, said shields providing a plurality of passages to said detector element for said induced radiation, said passages extending at a selected angle to said borehole.

2. Apparatus as recited in claim 1 wherein said detector element is provided with centralizing means adapted to maintain said detector element centralized in the borehole.

3. Apparatus as recited in claim 1 wherein said selected zone is a mud filtrate flushed zone.

4. A system for logging boreholes to distinguish subsurface formations having different hydrogen concentrations comprising means for bombarding said subsurface formations with primary radiation; means for detecting induced secondary radiation resulting from said primary radiation bombardment returned to the bore hole and for translating said secondary radiation detected into electrical pulses, the heights and numbers of which are proportional to energies and intensities, respectively, of said secondary radiation detected; means for discriminating said pulses in height to distinguish one series of pulses representative of detected secondary radiation emanating from a first selected zone surrounding said borehole from another series of pulses representative of detected secondary radiation emanating from a second selected zone surrounding said borehole, said second zone including and extending a greater radial distance from the borehole than said first zone, said detected radiation emanating from said first selected zone being neutrons; and means for resolving each series of pulses to a common denominator and for recording said electrical pulses versus depth of borehole traversed on the same log.

5. A system as recited in claim 4 wherein said primary radiation is neutrons.

6. A system as recited in claim 5 wherein said first selected zone is a mud filtrate flushed zone.

7. A system for logging boreholes to distinguish subsurface formations having different hydrogen concentrations comprising means for bombarding subsurface formations with primary radiation; means for detecting induced secondary radiation returned to the borehole resulting from said bombardment and for translating said secondary radiation into electrical pulses, the heights and numbers of which are proportional to energies and intensities, respectively, of said secondary radiation detected; said electrical pulses being translated from secondary radiation having energies indicative of radiation emanating from a deep selected zone surrounding the borehole; means including a plurality of spaced-apart concentric, overlapping, conically configured radiation shields arranged on said radiation detector means, said shields providing a plurality of passages to said detector element for said secondary radiation, said passages extending at a selected angle to said borehole adapted to detect said secondary radiation returning to the borehole from a selected zone surrounding the borehole shallower than said deep zone, and means for resolving the series of pulses representative of radiation emanating from said deep zone and the other series of pulses representative of radiation emanating from said shallow zone to a common denominator and also for recording both series of electrical pulses versus depth of borehole traversed on the same log.

8. A system as recited in claim 6 wherein said primary and secondary radiation are neutrons.

References Cited in the file of this patent
UNITED STATES PATENTS

| | | |
|---|---|---|
| 2,648,012 | Scherbatskoy | Aug. 4, 1953 |
| 2,727,155 | Herzog | Dec. 13, 1955 |
| 2,752,504 | McKay | June 26, 1956 |
| 2,769,918 | Tittle | Nov. 6, 1956 |